Aug. 26, 1930.   R. MAYNE   1,774,284
MOTOR CONTROL SYSTEM
Filed April 15, 1927   3 Sheets-Sheet 1
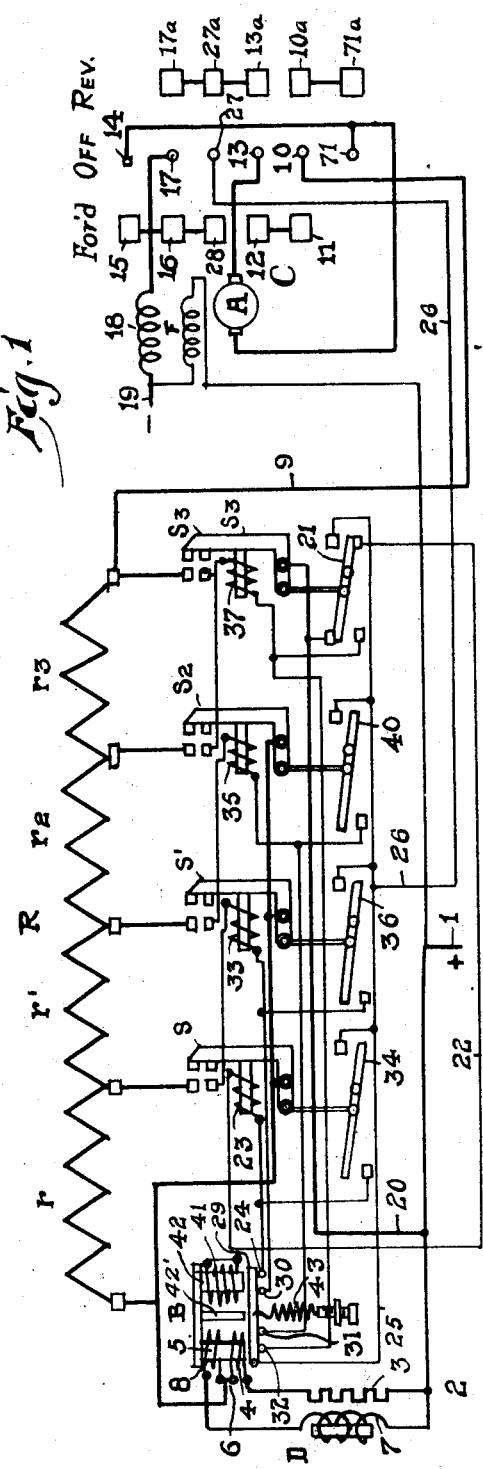
INVENTOR.
Robert Mayne
BY
F. N. Barber
ATTORNEYS.

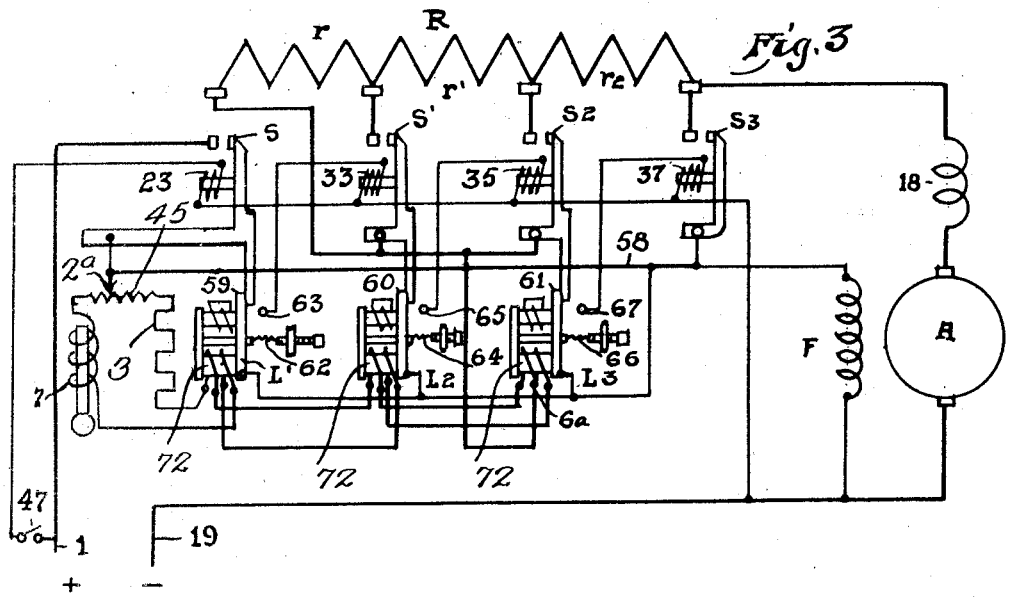
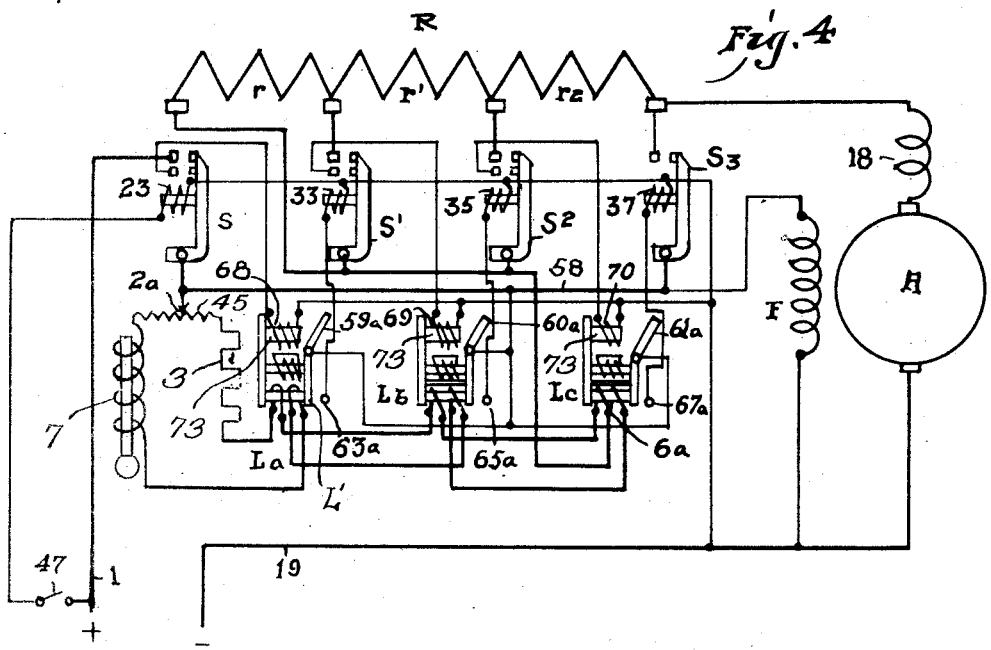

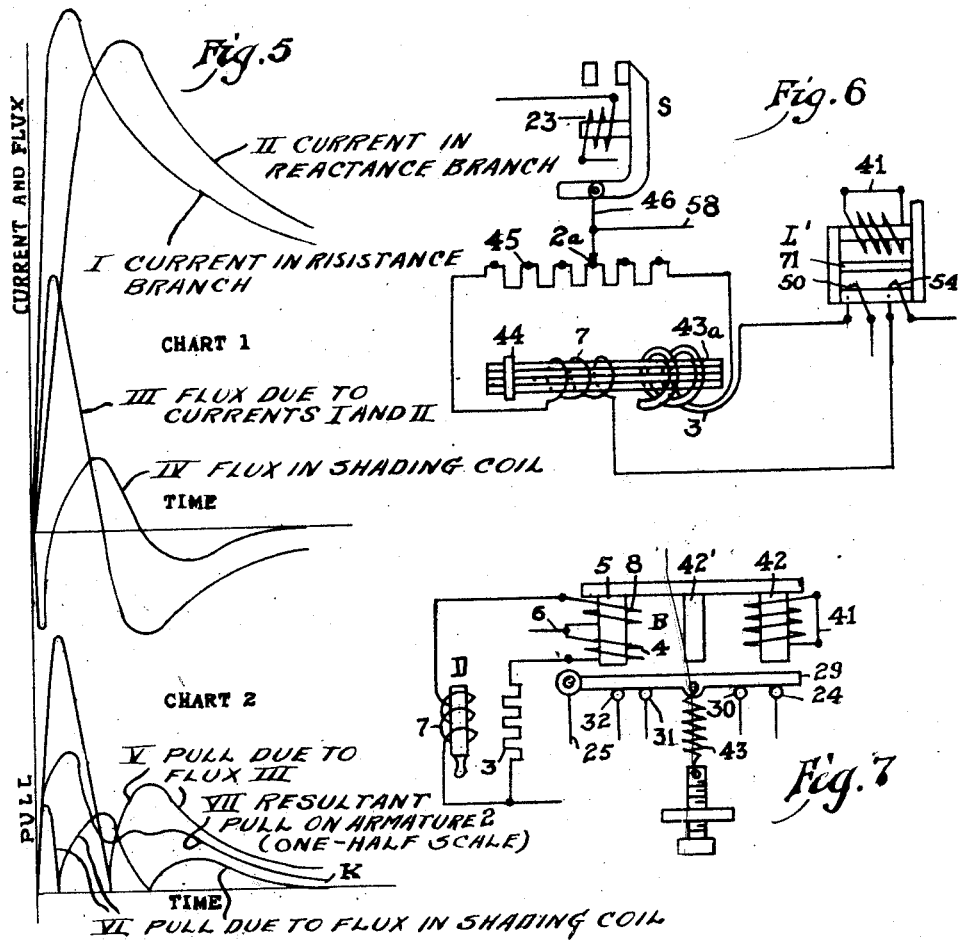

Patented Aug. 26, 1930

1,774,284

UNITED STATES PATENT OFFICE

ROBERT MAYNE, OF CLEVELAND, OHIO, ASSIGNOR TO THE ELECTRIC CONTROLLER & MANUFACTURING COMPANY, OF CLEVELAND, OHIO, A CORPORATION OF OHIO

MOTOR-CONTROL SYSTEM

Application filed April 15, 1927. Serial No. 184,138.

My invention relates to motor control systems.

One object of this invention is to provide improved means whereby motors may be started, stopped, and reversed in a safe, reliable and efficient manner. More specifically my object is to provide an automatic acceleration system in which resistance is removed in steps from the motor circuit by means of a series of contactors, the closing of the contacts being controlled in accordance with the rate of change of some characteristic of the motor, such as the rate of change of current in the motor or motor circuit, or in accordance with the rate of change of counter-electromotive force of the motor, which rate of change is proportional to the speed of the motor, or in accordance with the voltage drop across the accelerating resistor. Other objects appear hereinafter.

Referring to the accompanying drawings, Figs. 1, 2, 3 and 4 show diagrammatically four of the many systems in which my invention may be utilized.

Fig. 5 is a graphic representation showing current and flux plotted against time. Fig. 6 shows diagrammatically an enlarged view of the arrangement of the windings 3ª and 7 and their core 43ª in connection with some of the adjacent features. Fig. 7 is an enlarged diagrammatic representation of the relay B and some of its related features, as an aid to the interpretation of Fig. 5.

Referring first to Fig. 1, it shows a manually-operated reversing controller C. When the controller is moved to the "forward" position, marked "For'd", motor current flows from the positive current-supply wire 1 to the point 2 where it divides, one path being through the non-inductive resistance 3 and the winding 4 on the fixed core 5 of the multiple-contact relay B to the point 6 and the other path being through the winding 7 of the reactor D and the winding 8 on the core 5 to the point 6, whence the current from both paths flows through all the resistance R, the wire 9, the contacts 10, 11, 12, and 13 on the controller C, the motor armature A, the contacts 14, 15, 16 and 17 on the controller C, and the series field winding 18 to the negative current supply wire 19. The current in the circuit traced causes the motor armature to rotate, the current rising perhaps 50% above normal or full load value.

Simultaneously with the closing of the motor circuit, a control circuit is established from the wire 1 through the wire 20, the switch 21 which is held closed by the contactor S³ when open, the wire 22, the operating winding 23 of the accelerating contactor S, the fixed contact 24 and the movable contact or armature 29 of the relay B, the wires 25 and 26, the contacts 27, 28, 16 and 17 on the controller C, and the field winding 18 to the supply wire 19. The relay B and the contactor S are so made that upon the flow of current through the said circuits, the relay moves its contact 29 away from its fixed contact 24 before the current in the winding 23 can cause the contactor S to close. Consequently, the contactor S remains open.

Let it be assumed that the ohmic resistances in the two parallel paths between the points 2 and 6 are the same and that the windings 4 and 8 have the same number of turns and have the same ohmic resistance and are differentially wound on the core 5. Consequently, when the motor current is constant, both paths receive the same amount of current, so that the fluxes produced by the windings 4 and 8 neutralize each other and produce no attraction on the armature 29. When the controller C closes the motor circuit, the motor current rises very rapidly until it reaches its peak at which its rate of change becomes zero. Then the motor current diminishes and would, unless prevented, drop until its rate of change becomes zero, at which the motor would run at a constant speed depending upon the load.

While the motor current is rising, current in the path containing the non-inductive resistance 3 increases at approximately the same rate as the increase of motor current, but the current in the path containing the reactance winding 7 is choked down to a lower rate of increase, so that at any instant while the motor current is rising the current in the resistance path is the greater and the winding 4 of the relay B receives more current than the opposing winding 8 and causes the armature or contact 29 to be moved away from its contact 24, thereby opening the circuit of the winding 23 and preventing the premature closure of the contactor S. The contact 29 is held open by the excess flux due to the winding 4 until the rising motor current reaches zero rate of change, at which time the relay B would let the contact close under the influence of the spring 43 if it were not held closed by the shading coil 41 on the core 42 on the relay, the shading coil producing a flux flowing through the core 42, the adjacent part of the frame of the magnet B, the branch or leg 42′ connected to the said frame between the cores 5 and 42 and engaged by the contact 29 when closed, and the said contact back to the core 42. This flux lags behind the main flux due to the excess of current in the winding 4 over that due to the current in the winding 8. As the motor current decreases from its peak the path containing the reactance winding 7 transmits the larger current and causes the winding 8 to generate more flux than is generated by the winding 4, so that the contact 29 is held open by the winding 8 until the rate of change of the motor current drops to such a value that the excess flux generated by the winding 8 is unable to prevent the contact 29 from closing under the pull of the spring or its equivalent. Preferably the relay is adjusted to release the contact 29 at a predetermined rate of decreasing current somewhat above zero rate. The tension of the spring 43 can be adjusted by the screw to cause the contact 29 to close as desired.

Upon the release and closure of the contact 29 the circuit of the winding 23 is closed through the fixed relay contact 24, causing the closure of the contactor S and the short-circuiting of the section r of the resistance. Another rush of motor current ensues and again causes the relay B to open the contact 29 so that the operating winding 33 of the contactor S′ can not receive current through the fixed relay contact 30. The opening of the contact 29 opens the circuit of the winding 23 through the contact 24, but a maintaining circuit for the contactor S is established by the auxiliary switch 34 which is closed by the contactor S in closing. The contact 29 is held open as before until the rate of change of the motor current reaches a value too small to create a flux in the relay sufficient to prevent the closure of the contact 29.

As soon as the contact 29 closes it closes the circuit of the winding 33 through the relay contact 30, whereupon the contactor S′ closes cutting out the section r′ of the resistance. Another rush of motor current follows. The contact 29 is opened as before preventing current reaching the operating winding 35 of the contactor S² through the fixed relay contact 31. The circuit of the winding 33 is maintained by the switch 36 which is closed by the contactor S′ in closing.

When the rate of change of the motor current again drops to a predetermined value, the contact 29 closes and the circuit of the winding 35 is closed, whereupon the contactor S² closes and the section $r^2$ of the resistance is short-circuited. The winding 35 now receives maintaining current through the auxiliary switch 40 closed by the contactor S² in closing.

When the rate of change of the motor current again drops to a predetermined value, the contact 29 again closes and connects the operating winding 37 of the contactor S³ to the return wire 25 through the fixed relay contact 32. The contactor S³ now closes cutting out the final section $r^3$ of resistance. The contactor S³ upon closing opens the switch 21 and connects the winding 37 to the return wire 25 whereby the contactor S³ is held closed. The supply wire 1 is now connected directly to the contactor S³ by the wire 20 which short-circuits all the resistance, the said parallel paths and the windings of the contactors S, S′ and S². Consequently these contactors open.

If the controller C in Fig. 1 is moved to the reverse position, marked "Rev.", the contacts 17, 27, 13, 10 and 71 will engage respectively the contacts $17^a$, $27^a$, $13^a$, $10^a$ and $71^a$. The circuits will be the same as those described except that the current flows through the armature A in the opposite direction. When the controller is moved to the "off" position the motor circuit is opened and all parts return to the position shown in Fig. 1.

Referring now to Fig. 2, the drum controller C of Fig. 1 has been omitted as it or another type of controller can readily be supplied if required.

The windings 3 and 7 have their corresponding ends connected to the respective ends of the resistance 45 composed preferably of German silver wire or other material having similar resistance characteristics. The remaining end of the resistance 3 is connected to the winding 50 on the lock-out device L′ and the remaining end of the winding 7 is connected to the winding 54 on the same lock-out device. The point $2^a$ is adjustable along the wire 45 in order to cause current flowing through the resistance winding 3 and the winding 7 to be divided in selected ratios.

Current being supplied to the wires 1 and 19, the hand switch 47 is closed, whereby there is established a control circuit as follows: From the supply wire 1 through the switch 47 the wire 48 the operating winding 23 for the contactor S and the return wire 49 to the supply wire 19. Current in the winding 23 causes the contactor to close, the motor circuit being established as follows: From the supply wire 1 through the contactor S to the point $2^a$, where the current divides, one branch being through the resistance 3, the windings 50, 51 and 52 on the lock-out device $L'$, $L^2$ and $L^3$ for the contactors $S'$, $S^2$ and $S^3$, to the point $6^a$, and the other branch being from the point $2^a$ through the winding 7 and the windings 54, 55 and 56 wound on the same cores as the respective windings 50, 51 and 52 are wound, but differentially therewith. From the point $6^a$ the united circuit continues through the wire 57, the resistance R, the series field winding 18, and the armature A to the supply wire 19. The two parallel circuits between the points $2^a$ and $6^a$ may have equal or unbalanced resistances like the parallel branches between the points 2 and 6 in Fig. 1. The relative amount of current in the two branches may be adjusted to produce the required unbalancing of the flux produced by the pairs of windings 50—54, 51—55, and 52—56 by attaching the wire 46 at the required place on the wire 45.

The contactors $S'$, $S^2$ and $S^3$ have tail pieces which are attracted to the respective lock-out devices $L'$, $L^2$ and $L^3$ when there is sufficient excess current in one of the differential windings to hold the contactors open against the pull of the operating windings for the contactors. The lock-out devices $L'$, $L^2$ and $L^3$ have shading coils $41'$, $41^a$, $41^b$ operating like the shading coils in Fig. 1.

The frame of each lock-out device has a magnetic leg 71 lying between its shading coil and its other two coils, the legs 71 engaging the tail pieces of the contactors when closed and like the leg $42'$ in Fig. 1 dividing the magnetic circuit so that the shading coils are energized by the flux in one branch and the energizing coils being wound on the other branch.

As soon as the contactor S closes, current is supplied to the operating winding of the contactor $S'$, but the rising current in the path having the resistance 3, which is in excess of that flowing in the choked branch having the windng 7, holds the contactor $S'$ open. While the rising current is passing through zero rate of change the shading coil $41'$ holds the contactor $S'$ open. During the decrease of motor current from its peak, the winding 54 holds the contactor open until the rate of change of motor current becomes too low to permit the lock-nut device $L'$ to prevent the winding 33 from closing the contactor $S'$.

Upon the closing of the contactor $S'$, the resistance section $r$ is short-circuited and the motor current rushes through the motor circuit as before. The lock-out device $L^2$ prevents the winding 35 from closing the contactor $S^2$ until the motor current reaches its peak and its rate of change drops to a predetermined point, whereupon the contactor $S^2$ closes and cuts out the section $r'$ of the resistance and completes the circuit of the operating winding 37 of the contactor $S^3$. The lock-out device $L^3$ prevents the contactor $S^3$ from closing until the rush of current due to the closing of the contactor $S^2$ reaches its peak and the rate of change of current drops to a point which permits the current in the winding 37 to close the contactor $S^3$ against the pull of the lock-out device $L^3$. Upon the closing of the contactor $S^3$ the motor current flows from the wire 46 directly through the wire 58 to the contactor $S^3$, whereby all the devices between the points $2^a$ and $6^a$, and the resistance R are short-circuited.

When the supply of current is cut off, the motor stops and the parts resume the positions shown in the drawing.

The reluctance of the magnetic circuit of the inductive winding 7 can be adjusted in any well known way to change the time-lag of the current in the reactive circuit when the motor current is rising. This adjustment makes it possible to use the same reactor for different horsepower ratings of the control system. It will be understood that the magnetic circuit represented by the core of the winding 7 is merely diagrammatic and may in actual construction take various forms with the gap variously placed and adjusted.

Referring now to Fig. 3, the parallel paths and the relays or lock-out devices $L'$, $L^2$ and $L^3$ are as in Fig. 2 and have armatures or movable contacts 59, 60 and 61 which are released under current conditions similar to those under which the tails of the contactors in Fig. 2 are released. The lock-out devices have the magnetic legs 72 arranged and functioning as the leg $42'$ in Fig. 1 and the legs 71 in Fig. 2. The tails of the contactors in Fig. 3 engage the armatures 59, 60 and 61 and prevent their release until after the corresponding contactors close their circuits.

Current being supplied to the wires 1 and 19 and the switch 47 having been closed, the contactor S closes connecting the motor in series with the parallel paths and the resistance R. When the contactor S closes the contact 59 is free to be moved by the spring 62 as soon thereafter as the falling rate of change of motor current will permit this. When the contact 59 is closed it engages the fixed contact 63 which connects the operating winding 33 of the contactor $S'$ in circuit with the wire 58, the winding 33 being energized by current in the following circuit: From the wire 1 through the contactor S, the wire 58, the contacts 59 and 63, the winding 33 to the wire 19. The current in the winding 33 causes the contactor $S'$ to close whereby the resistance section $r$ is cut out of the motor circuit. The closing of the contactor $S'$ frees the contact member 60 from its restraint and permits the spring 64 to pull the contact member 60 into engagement with the fixed contact 65 as soon as the rate of change of motor current decreases to a predetermined value. When the contact member 60 engages the contact 65 the operating winding of the contactor S² receives current which causes the contactor S² to close and cut out the resistance section r' and free the contact member 61 from its restraint. There is another rush of motor current which holds the contact member 61 open until the rate of change of motor current decreases to a predetermined value, whereupon the spring 66 pulls the contact 61 into engagement with the fixed contact 67. The operating winding 37 of the contactor S³ now receives current and causes the said contactor to close and cut out the resistance section r². The motor now receives current through the following circuit: From the wire 1 through the contactor S, the wire 58, and the contactor S³, the said parallel paths and the resistance R being thereby short-circuited.

Referring now to Fig. 4, the contactors and the relays are mechanically independent. The relays or lock-out devices Lª, L^b and L^c close their contact members 59ª, 60ª and 61ª magnetically and thereby close the circuits of the operating windings of the contactors. The lock-out devices have the magnetic leg 73 arranged and functioning as the leg 42' in Fig. 1, the legs 71 in Fig. 2, and the legs 72 in Fig. 3.

Upon closing the switch 47, the operating winding of the contactor S receives current and causes the same to close, thereby connecting the motor to the supply wires 1 and 19 through the parallel paths between points 2ª and 6ª, and all of the resistance R. The rush of motor current locks out the relay Lª until its rate of change has decreased to a predetermined value at which the magnetic pull due to the winding 68 on the contact member 59ª overcomes the magnetic restraining pull of the relay Lª and causes the contact member 59ª to engage its fixed contact 63ª. The winding 68 receives positive current through auxiliary contacts on the contactor S. The closing of the contacts 59ª and 63ª connects the operating winding 33 of the contactor S' to the supply lines and this contactor closes and cuts out resistance section r. A rush of motor current follows causing the relay L^b to lock out the contact 60ª until the rate of change of the diminishing motor current falls so low that current in the winding 69 on the relay L^b causes the contact 60ª to engage its fixed contact 65ª. The winding 69 receives current through auxiliary contacts on the contactor S'. The closing of the contact 65ª enables the operating winding 35 of the contactor S² to receive current and it closes cutting out resistance section r', causing another rush of motor current which locks out the contact 61ª of the relay L^c until the rate of change of the motor current falls to a point at which the winding 70 on the relay L^c causes the contact 61ª to engage its fixed contact 67ª. The winding 70 receives current through contacts on the contactor S². The closing of the contact 61ª causes the operating winding 37 of the contactor S³ to receive current and to close and cut out the remaining section r² of resistance. The resultant motor circuit is as in Fig. 3.

In general, upon the operation of any contactor which causes a rise of current in the motor circuit, the rate of change of current which may be considered as positive, is always above the releasing value of the lock-out device. When the motor accelerates, causing the motor current to change from an increasing current to a decreasing current, the rate of change of current passes through zero and becomes negative. The shading coil, due to the change of flux in the magnetic circuit with which it is associated prevents the release of the lock-out device while the rate of change of current passes through zero. Thereafter the rate of change of current is negative and gradually diminishes in value as the motor accelerates until it reaches a value equal to the releasing value of the lock-out device, thereby effecting the operation of the next acceleration contactor.

If, when the first contactor closes, insufficient current is admitted to the motor circuit for the motor to develop sufficient torque to accelerate the load, the current will remain constant after the first peak of current is reached. The rate of change of current then becomes zero and the lock-out device, or relay, will permit the closing of the second contactor after a definite time lag, thereby cutting out the first section of resistance. This admits more current to the motor circuit, the motor developing more torque which should start the load.

If the motor torque is still insufficient to start the load, the rate of change of motor current becomes zero after the second peak of current, and the lock-out device, or relay, will permit the next contactor to close after another definite time lag. As soon as the motor starts, upon closure of the contactor which allows sufficient current to flow to start the motor, the shading coil of the lock-out device which controls the succeeding contactor will prevent the operation of that contactor when the rate of change of current passes through zero while the current is changing from a rising value to a diminishing value and will permit that contactor to operate when the rate of change of current is at a predetermined value with diminishing current.

If the motor is stalled so that it cannot start the overload devices commonly furnished with automatic motor starters, will open the contactors before sufficient current flows to injure the motor or the control apparatus.

It is clear that the reverser C in Fig. 1 may be omitted or that a magnetic reverser may be used in its place, and that the systems shown in Figs. 2, 3 and 4 may be supplied with any suitable type of reverser.

Referring to Fig. 5, Chart 1 which contains curves I, II, III, and IV shows current and flux plotted against time and Chart 2 which contains curves V, VI, and VII shows magnetic pull plotted against time. On Chart 1 curve I represents the current values in the branch circuit containing the resistance 3 and the winding 4. Curve II represents the current values in the branch circuit containing the reactance winding 7 and the winding 8.

These values are both positive, but since the windings 4 and 8 are wound differentially, the pull on the armature 29, due to the flux from the core 5, is proportional to the difference between the instantaneous values of the current in these windings and is represented by the curve III. The curve III passes through zero at the times the curves I and II cross each other, indicating that current in the windings 4 and 8 are equal and that there is no pull on the armature due to those windings. However, the current in the shading coil 41 shown by the curve IV, is proportional to the rate of change of flux represented by the curve III. As the rate of change is greatest when passing through zero, the current in the shading coil is at its maximum and causes a flux in the core 42 which prevents the armature from dropping at the time when there is no flux in the core 5.

Although the flux, which is proportional to current, has positive and negative values as shown by curves III and IV, the resultant pull on the armature by flux in the cores 5 and 42 has always a positive value. In Chart 2 the curves V and VI are the same as the curves III and IV in Chart 1, with the negative values transferred to positive values. Curve VII shows the resultant pull on the armature by the cores 5 and 42 and is the sum of the instantaneous values of the curves V and VI. Curve VII is plotted with values equal to one-half the sum of the instantaneous values of the curves V and VI.

The pull on the armature at which its release occurs is represented at the point K, the pull on the armature always being above the point prior to the time when the relay is to close its contacts.

Fig. 6 shows both the resistance winding 3 and the reactance winding 7 wound on the magnetic core 43ª, the gap in whose circuit may be adjusted by selecting a non-magnetic shim 44 of proper thickness. The winding 3 is made double as shown so that the induction of one-half is neutralized by that of the other one-half. The motor current flowing through the two windings will heat them and change their ohmic resistance values. In order to have these resistance values remain balanced or in a selected ratio by the adjustment of the point 2ª on the resistance 45, the resistance is wound non-inductively on the core 43ª so that it will also be heated to the same temperature as the winding 7. By making the resistance winding 3 of the same sized wire as the wire of the winding 7 and by making the length of the wire in each of the windings have the same length, they will both have the same resistance values because as the temperature of the windings increases their resistance values will increase at the same rate. This has been found to be important in order to secure uniform operation of the relays and contactors which have the windings 3 and 7 in parallel branches.

I do not desire to be restricted to the combinations and details shown and described as many changes may be made within the scope of the appended claims.

I claim—

1. In an electric motor system, an electric motor, a circuit containing the motor and two parallel paths, one path containing a resistance and the other path containing a reactance, and an electro-responsive device controlling the said circuit and having differential windings, one in series with said resistance and the other in series with said reactance.

2. In an electric motor system, an electric motor, a circuit therefor, an electro-responsive means for effecting the increase of current in the circuit, and inductive means subject only to the varying motor current in the said circuit, means controlled by the inductive means and controlling the electro-responsive means for preventing the operation of said electro-responsive means when the rate of change of motor current diminishes with a rising current in the circuit and means for effecting the operation of said electro-responsive means when the rate of change of motor current diminishes below a certain value with a diminishing current in the circuit.

3. In an electric motor control system, a motor circuit having two parallel paths, one path containing a resistance and the other path containing a reactance, a plurality of acceleration contactors for the said circuit, and electromagnetic means for effecting the closure of the said contactors in response to the rate of change of current in the motor circuit, the said electro-responsive means including two differential windings, one connected in one branch of the said parallel path in series with the said resistance and the other connected in the other branch of the parallel paths in series with the reactance.

4. In an electric motor control system, a motor circuit having two parallel paths, one path containing a resistance and the other path containing a reactance, a plurality of acceleration contactors for the said circuit, and electromagnetic means for effecting the closure of the said contactors in response to the rate of change of current in the motor circuit, the said electro-responsive means including two differential windings, one connected in one branch of the parallel path in series with the said resistance and the other connected in the other branch of the parallel paths in series with the reactance, a third winding shorted on itself and means energized by the third winding to produce a holding force when the resultant force of the flux of the first two windings passes through zero with an increasing current in the circuit.

5. In an electric motor control system, a motor circuit, a section of resistance therein, electro-responsive means for cutting out said resistance in response to a rate of change of current in the motor circuit and inductive means subject only to the change in current in the said motor circuit, means controlled by the inductive means and controlling the electro-responsive means for preventing the cutting out of said resistance when the rate of change of current diminishes with a rising current in the motor circuit and means for effecting the cutting out of said resistance when the rate of change of current diminishes with a decreasing current in the motor circuit.

6. In an electric motor control system, a motor circuit, a resistance therein, a plurality of electro-responsive devices for automatically cutting out the said resistance in response to a rate of change of current in the motor circuit, and inductive means affected only by the changing current in the motor, means controlled by the inductive means and controlling the electro-responsive means for effecting the operation of said electro-responsive devices only when the rate of change of current in the motor circuit diminishes below a certain value with a decreasing current in the motor circuit.

7. In an electric motor system, an electric motor, a circuit therefor, a resistance in the circuit, a switch for effecting the reduction of resistance in the circuit, a magnet having two windings, one of which is connected in series with a reactance and the other in series with a resistance, the reactance and the said winding in series therewith being in parallel with the last named resistance and the said winding in series therewith, these parallel circuits being in series with the said circuit and means associated with said magnet for preventing the switch from effecting the reduction of the first resistance when the rate of change of current in the said circuit is above a certain value.

8. In an electric motor control system, a circuit, a motor and a resistance therein, a switch which upon closure reduces the resistance in the said circuit, an electromagnetic means for closing the switch, an electromagnetic device having two differentially wound coils for preventing and permitting the closing of the switch, means whereby a predetermined difference in flux is generated by the windings and thereby prevents the switch from closing while there is a positive rate of change in the motor current during acceleration and while there is a negative rate of change in the motor current to a predetermined value, a shading coil, means energized by current in the coil and inductively related to the said means for preventing the release of the switch when the rate of change of motor current becomes zero on rising current, and electro-magnetic means for closing the switch when the differential of flux due to the two windings diminishes to a predetermined value.

9. In an electric motor system, an electric motor, a circuit therefor, a pair of contacts in the said circuit, an electro-responsive means for operating the said contacts, an electro-magnetic lockout for said electro-responsive means, means included in the said circuit and controlled by current in the said circuit only to make the lockout effective when the rate of change of current in the said circuit is above a predetermined value, and means including a shading coil for maintaining the said lockout effective when the current in the said circuit changes from an increasing to a decreasing value.

10. In an electric motor system, an electric motor, a circuit therefor, an electromagnetic contactor for closing and opening contacts therein, an electromagnetic lockout for the said contactor, means included in the said circuit and controlled by current in the said circuit only to make the lockout effective when the rate of change of current in the said circuit is above a predetermined value, and means including a shading coil for maintaining the said lockout effective when the rate of change of current in the said circuit changes from a positive to a negative value.

11. In an electric motor system, an electric motor, a circuit therefor, a resistor, a contactor for cutting out the said resistor, a lockout device for the said contactor, means included in the said circuit and controlled by the current in the said circuit only for producing a flux in said lockout device when the current is increasing in the said circuit, means for producing a flux in the said lockout device when the current in the said circuit is decreasing and means made effective by a reversal of flux in the said lockout device for producing a flux in a portion of the said device when the current in the said circuit changes from an increasing to a decreasing value.

12. In an electric motor system, an electric motor, a circuit therefor, an electromagnetic contactor for opening and closing contacts therein, a lockout for said contactor comprising two differential windings, means included in the said circuit and controlled by the current in the said circuit only to make the lockout effective by causing a greater flux to be generated by one winding during a positive rate of change of current in the said circuit, and means causing a greater flux to be generated by the other winding during a negative rate of change of current in the said circuit.

13. In an electric circuit, an electric motor, a circuit therefor, a resistance in the circuit, contactors operable to remove the resistance from the circuit in steps, an inductive winding subject only to current through the motor, and electro-responsive means controlled by the said winding in response to the rate of change of current in said circuit for operating the contactors when the rate of change of current with decreasing current only is below a predetermined value.

14. The combination of an electric motor, a circuit therefor, a resistance in the circuit, contactors operable to remove the resistance from the circuit in steps, an inductive means subject only to current through the motor, an electro-responsive device controlled by said inductive means in response to the rate of change of current in the said circuit for preventing the operation of the contactors when the rate of change in the current through the motor reduces to zero on rising motor current, and for effecting the operation of the contactors if the rate of change of current diminishes after thus becoming zero below a predetermined value on a decreasing current in the said circuit.

In testimony whereof, I hereunto affix my signature.

ROBERT MAYNE.